Dec. 8, 1925.           N. J. TAYLOR           1,564,644
PRESSURE GAUGE
Filed April 28, 1924
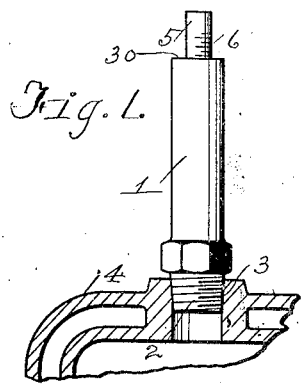
Fig. 1.
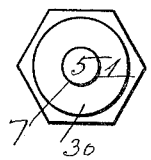
Fig. 3.
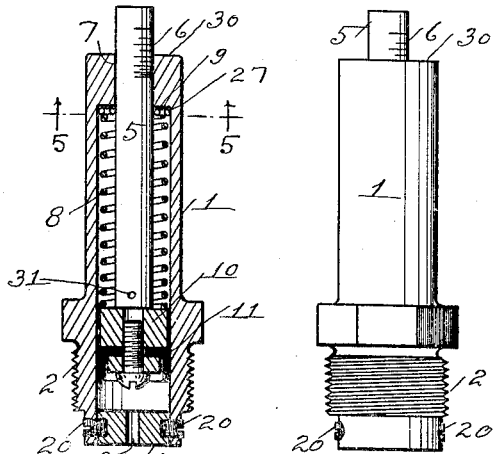
Fig. 2.
Fig. 7.
Fig. 4.
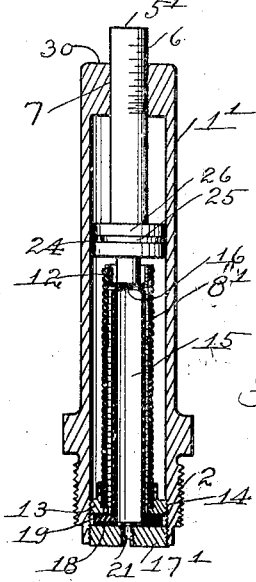
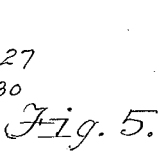
Fig. 5.
Fig. 6.
Witness:
Geo. L. Chapel
Inventor:
Nolan J. Taylor;
by Cyrus W. Rice
Attorney.

Patented Dec. 8, 1925.

1,564,644

UNITED STATES PATENT OFFICE.

NOLAN J. TAYLOR, OF WYOMING TOWNSHIP, KENT COUNTY, MICHIGAN.

PRESSURE GAUGE.

Application filed April 28, 1924. Serial No. 709,454.

*To all whom it may concern:*

Be it known that I, NOLAN J. TAYLOR, a citizen of the United States, residing at Wyoming Township, in the county of Kent and State of Michigan, have invented new and useful Improvements in Pressure Gauges, of which the following is a specification.

The present invention relates to pressure gauges; and its object is to provide an improved device for gauging the pressure in internal-combustion engines.

This object is attained by, and the invention finds preferable embodiment in, the structure or structures hereinafter particularly described in the body of this specification and illustrated by the accompanying drawings, in which:—

Figure 1 is a side view of a pressure gauge applied to an internal-combustion engine, a portion of which is shown in vertical section;

Figure 2 is a side view of a form of said gauge;

Figure 3 is a top plan view thereof;

Figure 4 is a central longitudinal sectional view of the same;

Figure 5 is a transverse sectional view thereof taken on line 5—5 of Figure 4;

Figure 6 is a central longitudinal sectional view of a modified construction of the gauge; and Figure 7 is a top plan view of the same.

My pressure gauge comprises a hollow cylindrical body 1, $1^1$ screw-threaded at its inner end (at 2) for detachable connection within the spark-plug opening 3 of an internal-combustion engine, a portion of which adjacent said opeing being shown at 4. An indicating rod 5, $5^1$, graduated as indicated at 6, is longitudinally movable in said body under pressure within the engine, and extends through an opening 7 in the outer end of said body. A spring 8, $8^1$, yieldingly resists said pressure. In the form of the device shown in Figure 4, this spring 8 presses between the outer end part of said body at 9 and a piston 10 slidable within said body and furnished with a packing member 11; whereas, in the modified construction shown in Figure 6, the spring $8^1$ is secured at its upper end to a cap 12 surrounding and pressing against the inner end of the rod $5^1$, the opposite end of this spring $8^1$ being secured to a nut 13 threaded at 14 in said body $1^1$. In the construction seen in this Figure 6, a rubber tube 15 closed at its upper end 16 is positioned inside the spring $8^1$, its lower open end being tightly secured to and beneath said nut 13 and held between it and the lower nut or plug $17^1$, a packing washer 18 preferably intervening between the nut plug $17^1$ and the radially extending flange 19 of said tube. In the construction seen in Figure 4, the plug 17 is inserted into the inner end of said body 1 and held therein by suitable means as by the set screws 20. In either construction, the plug 17 or $17^1$ has an opening 21 therethrough whereby the pressure of the gases in the engine passes into the device and, resisted by the spring 8 or $8^1$ presses the indicator rod outwardly.

In either construction, there are means within the body 1 or $1^1$ and intermediate its inner end and an end of the indicator rod for confining the expansive force from the engine to thus move the indicator rod outwardly against the spring 8 or $8^1$; in Figure 4 such means is the piston 10, whereas in Figure 6, such means is the rubber tube 15.

Means are provided for yieldingly holding the indicator rod in positions into which it has been moved. In the construction shown in Figure 6, such means is the spring 24 seated in an annular groove 25 in the enlarged portion 26 of the rod $5^1$; while in the construction seen in Figure 4, such means is the spring 27 surrounding the rod 5 and having a middle curved portion 28 extending through an arc of at least 180 degrees bearing on the inner surface of the body 1, and end portions bent at 29 toward said rod and then parallelly at 30 with said middle portion and bearing on the opposite sides of the rod—all as shown in Figure 5.

It will be seen that there is a frictional contact between this spring's middle portion 28 and the body 1 and between its end portions 30, 30 and the rod 5.

In practice, the spark-plug (not shown) is removed from the opening 3, and the device is screwed into said opening, whereupon the pressures in the engine may be gauged. A small amount of oil may be poured through the opening 3 upon the upper side of the piston of the engine to more completely prevent leakage at the piston.

It will be seen that the construction shown in Figure 4 particularly, presents a very compact arrangement of the necessary parts.

It will also be seen that by said construction, the plug 17 may be removed and the piston 10 and spring 8 may be removed, and also the indicator rod 5; and that when these parts are assembled, the plug 17 and the closed outer end 30 of the body holds all the parts in assembled position, the rod 5 being preferably provided with a lateral extension or pin, such as is shown at 31, for preventing the rod from being slid out from the hollow body through the opening 7 in the closed outer end.

I claim:

A device of the character described comprising: a hollow cylindrical body threaded at its inner end for detachable connection within the spark-plug opening in an internal-combustion engine; an indicator rod movable longitudinally in said body by pressure within the engine and extending through the outer end thereof; a spring yieldingly resisting said pressure; means within said body and intermediate its inner end and the inner end of the rod for confining the expansive fluid from said engine to move the rod outwardly; a spring for yieldingly holding the rod in moved position, surrounding the rod and having a middle curved portion extending through an arc of at least 180 degrees bearing on the inner surface of said body and end portions bent toward the rod and then concentrically with said middle portion and bearing on the opposite sides of the rod.

In testimony whereof I have hereunto set my hand at Grand Rapids, Michigan, this 24th day of April, 1924.

NOLAN J. TAYLOR.